US012804550B2

(12) United States Patent
Liu et al.

(10) Patent No.: US 12,804,550 B2
(45) Date of Patent: Nov. 17, 2026

(54) TRANSMIT POWER CONTROL WITH RADIO FREQUENCY EXPOSURE COMPLIANCE

(71) Applicant: QUALCOMM Incorporated, San Diego, CA (US)

(72) Inventors: Tienyow Liu, Santa Clara, CA (US); Raghu Narayan Challa, San Diego, CA (US); Farhad Meshkati, San Diego, CA (US); Yahia Ramadan, San Jose, CA (US); Jing Lin, Milpitas, CA (US); Tianpei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/545,791

(22) Filed: Dec. 19, 2023

(65) Prior Publication Data

US 2024/0214938 A1 Jun. 27, 2024

Related U.S. Application Data

(60) Provisional application No. 63/476,400, filed on Dec. 21, 2022.

(51) Int. Cl.
*H04W 52/02* (2009.01)
*H04W 52/36* (2009.01)

(52) U.S. Cl.
CPC ..... *H04W 52/0258* (2013.01); *H04W 52/367* (2013.01)

(58) Field of Classification Search
None
See application file for complete search history.

(56) References Cited

U.S. PATENT DOCUMENTS

| | | | | |
|---|---|---|---|---|
| 2021/0184714 A1* | 6/2021 | Jadhav | ................. | H04B 1/3838 |
| 2023/0328656 A1* | 10/2023 | Rudolf | ................ | H04W 52/143 |
| 2024/0244539 A1* | 7/2024 | Tiirola | ................ | H04W 52/367 |
| 2025/0374200 A1* | 12/2025 | Shibaike | ............. | H04W 52/146 |

OTHER PUBLICATIONS

International Search Report and Written Opinion—PCT/US2023/085135—ISA/EPO—Apr. 25, 2024.

* cited by examiner

*Primary Examiner* — Abdelillah Elmejjarmi
(74) *Attorney, Agent, or Firm* — Patterson & Sheridan LLP/Qualcomm

(57) ABSTRACT

Certain aspects of the present disclosure provide techniques and apparatus for operating a wireless device pursuant to radio frequency (RF) exposure compliance. A method that may be performed by a wireless device includes determining a transmit power associated with a transmission occasion and determining an energy usage associated with the transmission occasion based on the transmit power. The method also includes determining a total energy usage for a time window or a time interval associated with a RF exposure limit based on the energy usage associated with the transmission occasion. The method further includes transmitting a signal in the transmission occasion at the transmit power if the total energy usage satisfies an energy budget.

30 Claims, 12 Drawing Sheets

TRANSMIT POWER CONTROL WITH RADIO FREQUENCY EXPOSURE COMPLIANCE

CROSS-REFERENCE TO RELATED APPLICATION

This application claims the benefit of U.S. Provisional Patent Application Ser. No. 63/476,400, filed Dec. 21, 2022, which is hereby incorporated by reference herein in its entirety for all applicable purposes.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance and increased energy efficiency during transmission, for example, despite RF exposure compliance.

Certain aspects of the subject matter described in this disclosure can be implemented in a method for wireless communication by a wireless device. The method generally includes determining a transmit power associated with a transmission occasion and determining an energy usage associated with the transmission occasion based on the transmit power. The method also includes determining a total energy usage for a time window or a time interval associated with a radio frequency (RF) exposure limit based on the energy usage associated with the transmission occasion. The method further includes transmitting a signal in the transmission occasion at the transmit power if the total energy usage satisfies an energy budget.

Certain aspects of the subject matter described in this disclosure can be implemented in an apparatus for wireless communication. The apparatus generally includes one or more memories collectively storing executable instructions and one or more processors coupled to the one or more memories. The one or more processors are collectively configured to execute the executable instructions to cause the apparatus to determine a transmit power associated with a transmission occasion, determine an energy usage associated with the transmission occasion based on the transmit power, determine a total energy usage for a time window or a time interval associated with a RF exposure limit based on the energy usage associated with the transmission occasion, and transmit a signal in the transmission occasion at the transmit power if the total energy usage satisfies an energy budget.

Certain aspects of the subject matter described in this disclosure can be implemented in an apparatus for wireless communication. The apparatus generally includes means for determining a transmit power associated with a transmission occasion. The apparatus also includes means for determining an energy usage associated with the transmission occasion based on the transmit power. The apparatus also includes means for determining a total energy usage for a time window or a time interval associated with an RF exposure limit based on the energy usage associated with the transmission occasion. The apparatus further includes means for transmitting a signal in the transmission occasion at the transmit power if the total energy usage satisfies an energy budget.

Certain aspects of the subject matter described in this disclosure can be implemented in a computer-readable medium. The computer-readable medium has instructions stored thereon, that when executed by an apparatus, cause the apparatus to perform an operation. The operation includes determining a transmit power associated with a transmission occasion. The operation also includes determining an energy usage associated with the transmission occasion based on the transmit power. The operation also includes determining a total energy usage for a time window or a time interval associated with an RF exposure limit based on the energy usage associated with the transmission occasion. The operation further includes transmitting a signal in the transmission occasion at the transmit power if the total energy usage satisfies an energy budget.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
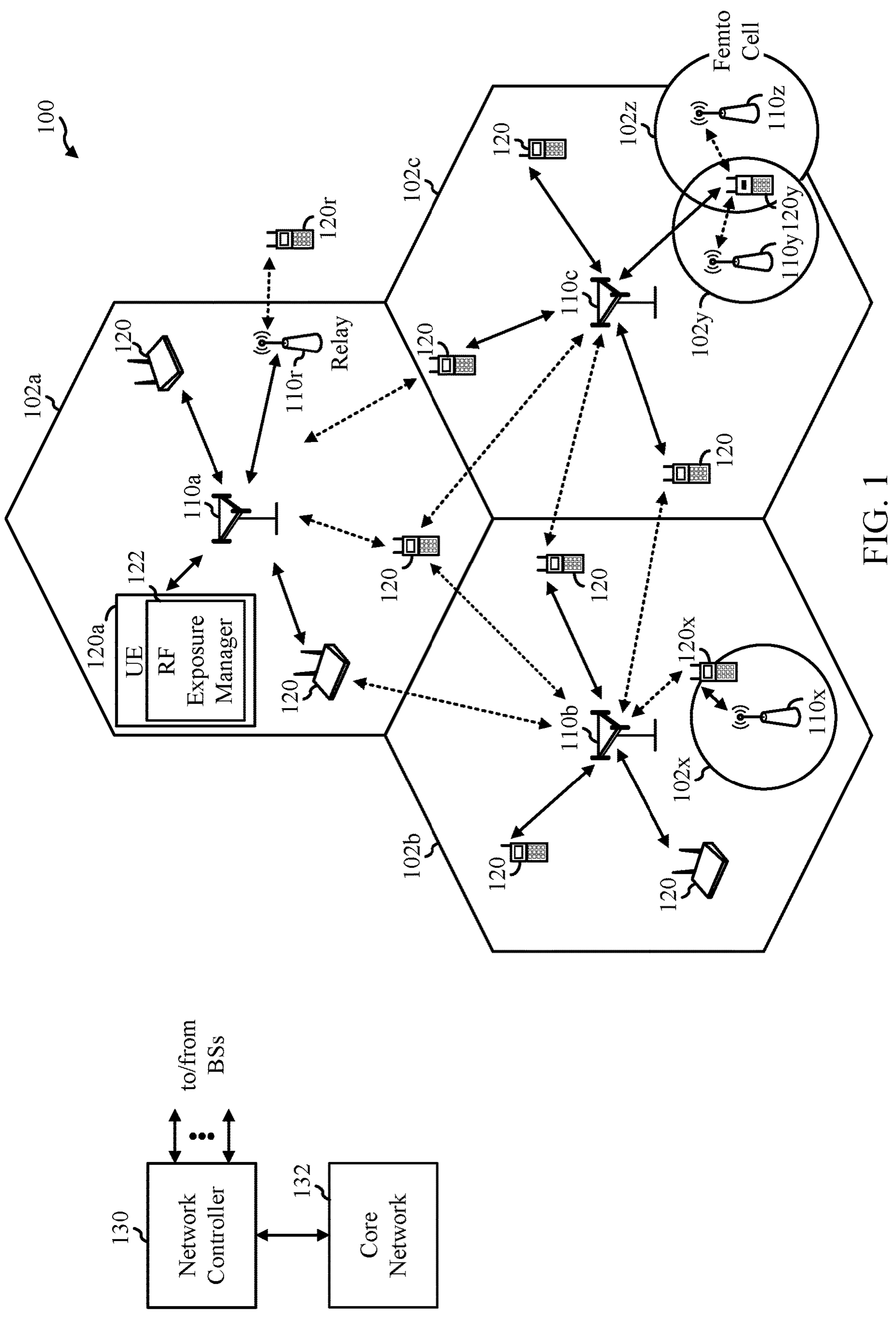
FIG. 1 is a block diagram conceptually illustrating an example wireless communication network, in accordance with certain aspects of the present disclosure.

Aspects of the present disclosure provide apparatus, methods, processing systems, and computer-readable mediums for transmit power control with radio frequency (RF) exposure compliance.

In certain cases, time-averaged RF exposure compliance may track the RF exposure from wireless communication devices (e.g., a Long Term Evolution (LTE) wireless device, a New Radio (NR) wireless device, a Bluetooth wireless device, etc.) over time. For example, during NR wireless communication, a wireless device (e.g., a user equipment (UE)) may determine a transmission power limit to guarantee RF exposure compliance for an uplink active duration. However, the actual uplink traffic may only be scheduled for a small part of the uplink duration. A transmission power limit that is compliant for a longer duration than actually used may result in a transmission power limit that is too weak for the communication link between the UE and network, and in certain cases, transmission energy may be wasted.

Aspects of the present disclosure provide apparatus and methods for performing transmit power control with RF exposure compliance. For example, for every transmission occasion, a wireless device (e.g., a UE) may determine an energy budget associated with an RF exposure limit for a time window. The wireless device may determine the energy usage for the time window by summing the energy usage associated with the transmission occasion and the past energy usage within the time window. The wireless device may transmit in the time window until the projected energy usage is greater than or equal to the energy budget, after which the wireless device may refrain from transmitting for the remainder of the time window.

The apparatus and methods for managing transmission power described herein may facilitate improved wireless communication performance (e.g., lower latencies and/or higher throughput) and/or increased energy efficiency. The improved wireless communication performance may be especially apparent when a wireless device is at or near the edge of a cell, where the wireless device may benefit from transmitting with a higher power level in order for the transmission to reach the network.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, non-terrestrial networks (NTN), and radio frequency identification (RFID) use cases (e.g., which may involve maintaining high transmission powers to meet link budget targets), as illustrative, non-limiting examples. NR access may support various wireless communication services, such as enhanced mobile broadband (cMBB) targeting wide bandwidth (e.g., 80 megahertz (MHz) or beyond), millimeter wave (mmWave) targeting high carrier frequency (e.g., 24 gigahertz (GHz) to 53 GHz or beyond), massive machine type communications (MTC) (mMTC) targeting non-backward compatible MTC techniques, and/or mission critical targeting ultra-reliable low-latency communications (URLLC). These services may include latency and reliability requirements. These services may also have different transmission time intervals (TTIs), for example to meet respective quality of service (QOS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), a NTN, a communication system that uses RFID for communication, or may be configured for communications according to an IEEE standard such as one or more of the 802.11 standards, etc., or may be representative of several such networks or systems which overlap in coverage and/or which communicate concurrently with one or more devices (e.g., with a UE such as the UE 120*a*). As shown in FIG. 1, the UE 120*a* includes an RF exposure manager 122 that ensures RF exposure compliance based on an energy usage derived from transmit power controls, in accordance with aspects of the present disclosure.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b*, and 110*c* may be macro BSs for the macro cells 102*a*, 102*b*, and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In some aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
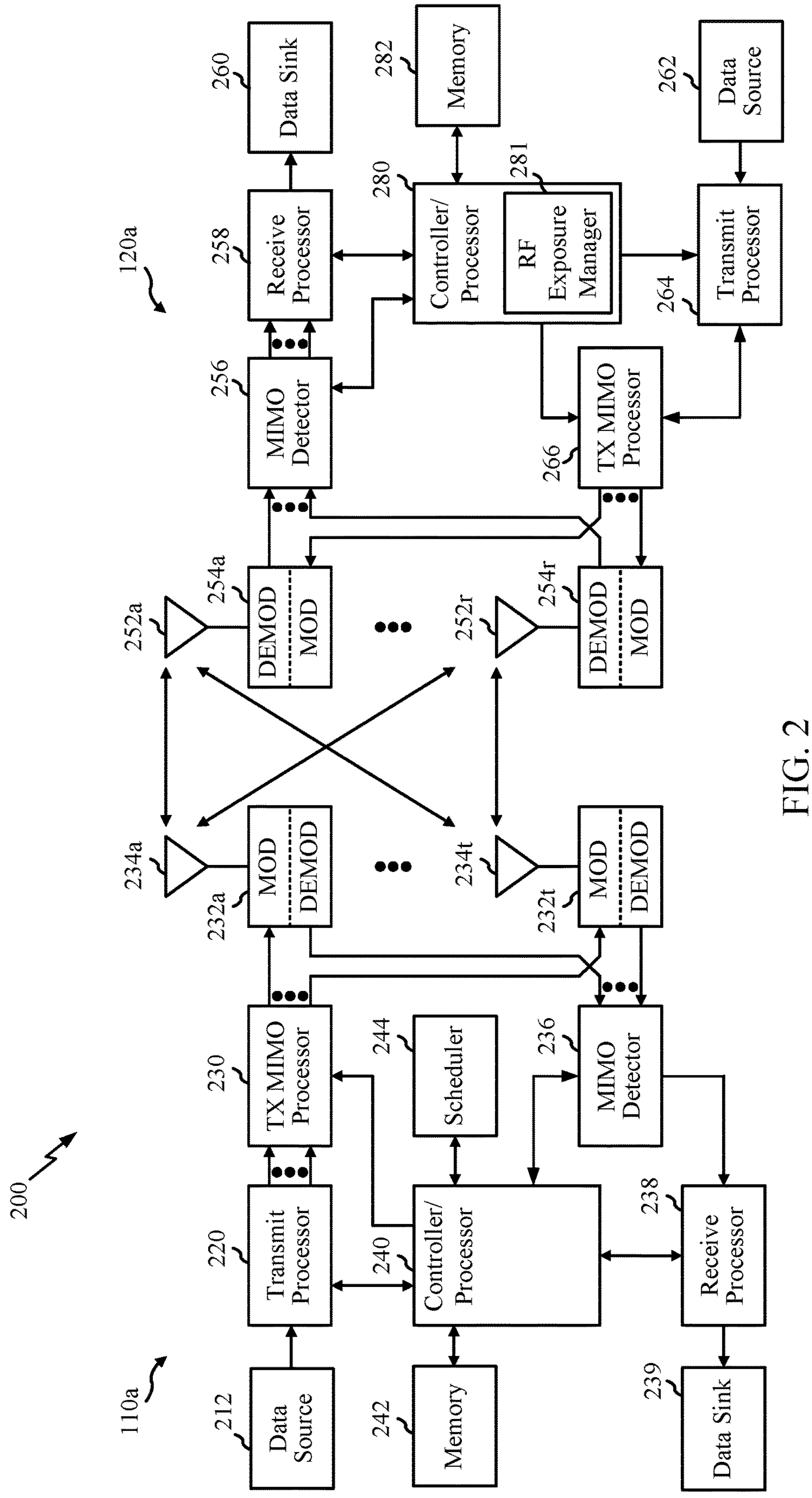
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for orthogonal frequency division multiplexing (OFDM), etc.) to obtain an output sample stream. Each of the transceivers 232*a*-232*t* may further process (e.g., convert to analog, amplify, filter, and upconvert) the output sample stream to obtain a downlink signal. Downlink signals from the transceivers 232*a*-232*t* may be transmitted via the antennas 234*a*-234*t*, respectively.

At the UE 120*a*, the antennas 252*a*-252*r* may receive the downlink (DL) signals from the BS 110*a* and may provide received signals to the transceivers 254*a*-254*r*, respectively. The transceivers 254*a*-254*r* may condition (e.g., filter, amplify, downconvert, and digitize) a respective received signal to obtain input samples. Each demodulator (DEMOD) in the transceivers 232*a*-232*t* may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254*a*-254*r* (e.g., for SC-FDM, etc.), and transmitted to the BS 110*a*. At the BS 110*a*, the uplink (UL) signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the controller/processor 280 of the UE 120*a* has an RF exposure manager 281 that is representative of the RF exposure manager 122, according to aspects described herein. Although shown at the controller/processor, other components of the UE 120*a* and BS 110*a* may be used to perform the operations described herein.

NR may utilize OFDM with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120*a* is described with respect to FIGS. 1 and 2 as communicating with a BS and/or within a network, the UE 120*a* may be configured to communicate directly with/transmit directly to another UE 120, or with/to another wireless device without relaying communications through a network. In some aspects, the BS 110*a* illustrated in FIG. 2 and described above is an example of another UE 120. In some examples, the UE 120*a* in FIG. 2 is representative of another device having similar components and/or functionality. For example, instead of the UE 120*a* communicating with the BS 110*a*, a customer premises equipment (CPE) may be configured to communicate with the BS 110*a* as described above and/or using components described above.

Example RF Transceiver

Figure 3:
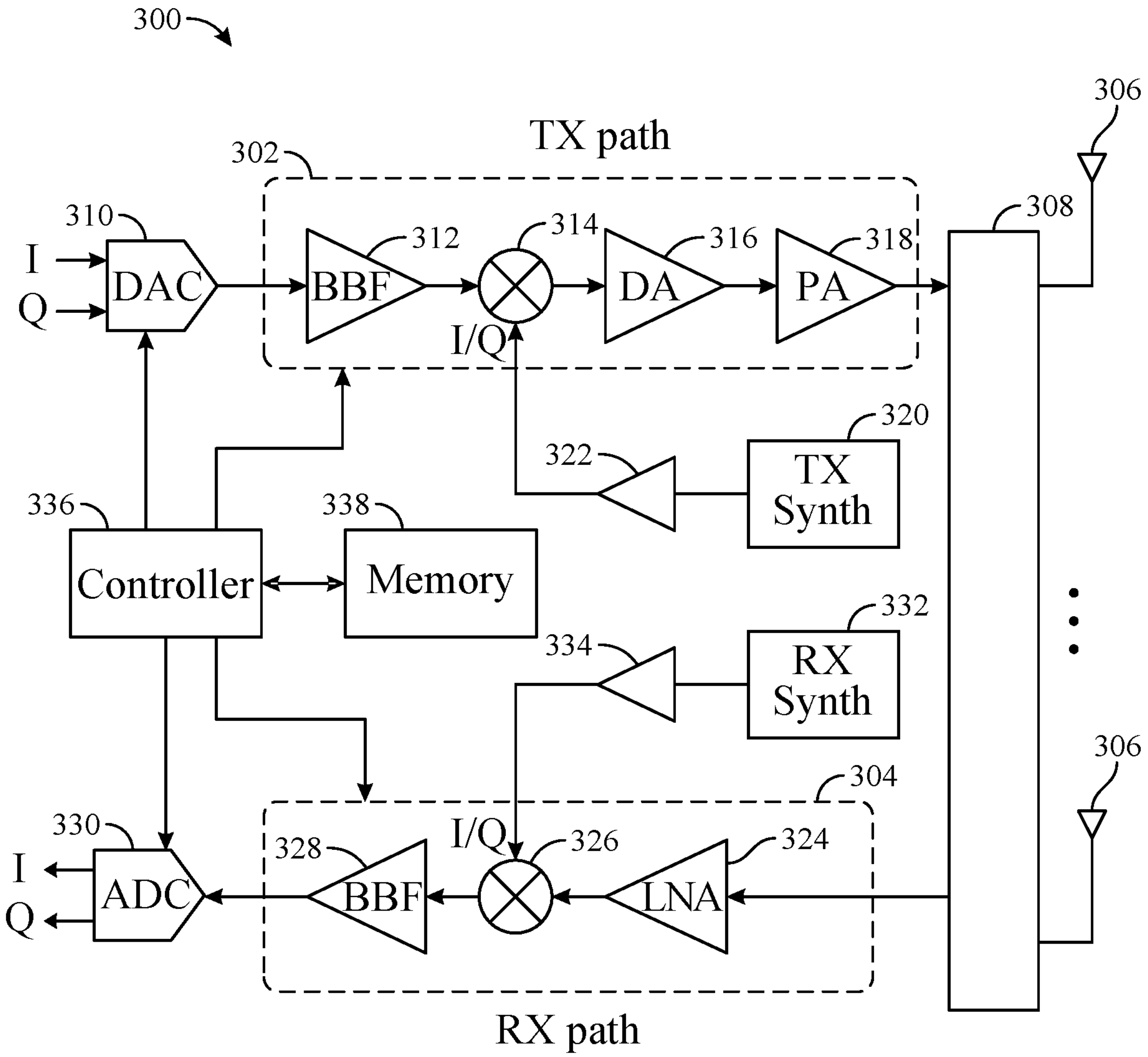
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain at the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter ($mW/cm^2$). In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHZ (e.g., mmWave 5G in 24 to 70 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHZ range in some examples.

Figure 4:
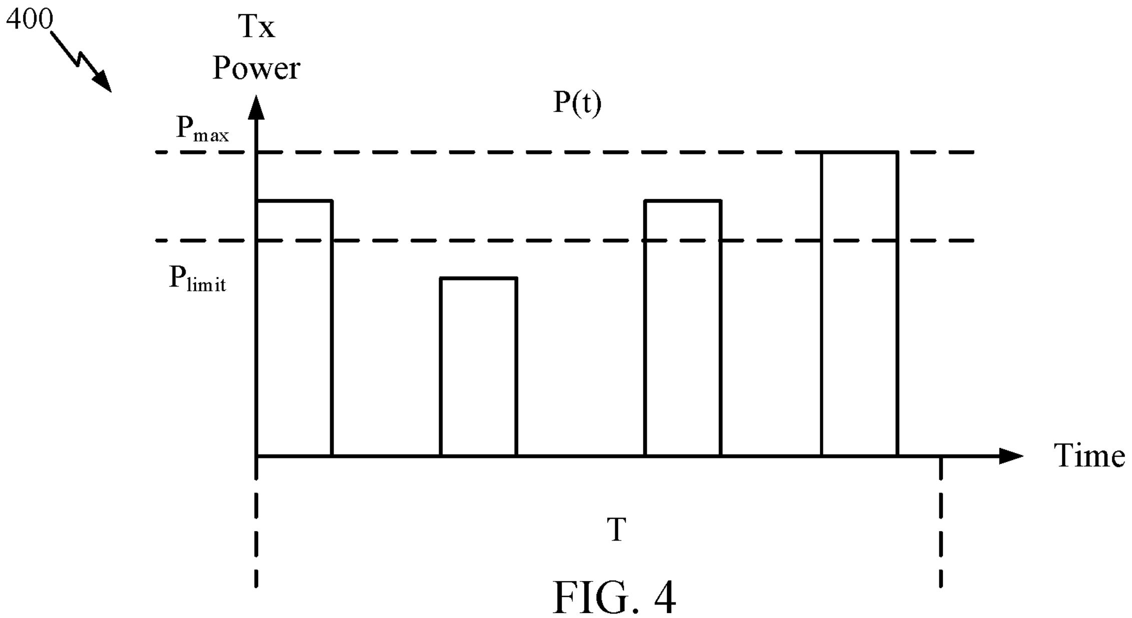
FIG. 4 is a graph illustrating an example of transmit power over time in compliance with a time-averaged RF exposure limit, in accordance with certain aspects of the present disclosure.

In certain cases, compliance with an RF exposure limit may be performed as a time-averaged RF exposure evaluation within a specified time window (T) (e.g., 2 seconds for 60 GHz bands, 100 or 360 seconds for bands≤6 GHZ, etc.) associated with the RF exposure limit. For example, FIG. 4 is a graph 400 of a transmit power over time (P(t)) that varies over the running time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than $P_{limit}$. In certain cases, the UE may transmit at $P_{max}$, which may be the maximum transmit power supported by the UE or the maximum transmit power that the UE is capable of outputting. In some cases, the UE may transmit at a transmit power less than or equal to $P_{limit}$ in certain transmission occasions. $P_{limit}$ represents the time-averaged threshold in terms of transmit power for the RF exposure limit over the time window (T), and in certain cases, $P_{limit}$ may be referred to as the maximum time-averaged power level or limit. $P_{limit}$ may represent the maximum transmit power that can be used continuously over the time window in compliance with the time-averaged RF exposure limit. The graph 400 also illustrates gaps between transmission bursts, where the gaps represent periods during which no transmission was sent from the device. In certain cases, the transmit power may be maintained at the maximum average transmit power level (e.g., $P_{limit}$) allowed for RF exposure compliance to enable continuous transmission during the time window. In some examples, the time-averaged RF exposure evaluation is calculated with respect to one or more rolling time windows.

RF exposure compliance may apply an RF exposure limit over a time window. For example, for certain mmWave bands, RF exposure compliance may apply a maximum power density exposure to human tissue limited to a 1 $mW/cm^2$ PD over a four-second window. If a wireless device transmits for the entirety of the four-second window (100% of the uplink transmission), the wireless device may only be allowed to transmit at a transmission power level corresponding to 1 $mW/cm^2$. In some instances, the communication link between the UE and network may require a transmit power that correlates to a power density of more than 1 $mW/cm^2$ in order to be received at the network. In such cases, the maximum transmission power limit may restrict the transmit power in order to ensure RF exposure compliance, for example, based on an assumption that transmissions will occur throughout the time window or relatively continuously for the entirety of the time window. As a result, some transmissions from the UE may not reach the network.

Example Transmit Power Control with Radio Frequency Exposure Compliance

Multi-mode/multi-band UEs have multiple transmit antennas, which may be able to simultaneously transmit in sub-6 GHz bands and bands greater than 6 GHz bands, such as mm Wave bands. As described herein, the RF exposure of bands 6 GHz and below may be evaluated in terms of SAR, and the RF exposure of bands greater than 6 GHz may be evaluated in terms of PD. Due to the regulations on simultaneous exposure, the wireless device may limit maximum transmit power for bands lower than 6 GHz and/or bands greater than 6 GHz.

Aspects of the present disclosure provide apparatus and methods for transmit power control with RF exposure compliance. For example, for every transmission occasion, a wireless device (e.g., UE) may determine an energy budget associated with an RF exposure limit for a time window. As used herein, a transmission occasion may refer to a transmission time interval (TTI) or to another determined time within the time window during which the wireless device is able to transmit. The wireless device may determine the energy usage for the time window by summing the energy usage associated with the transmission occasion and the past energy usage within the time window. The wireless device may transmit in the time window until the projected energy usage is greater than or equal to the energy budget, after which the wireless device will refrain from transmitting.

The apparatus and methods for transmit power control described herein may facilitate improved wireless communication performance (e.g., lower latencies and/or higher throughput) and/or increased energy efficiency. The improved wireless communication performance may be especially apparent when a wireless device is at or near the edge of a cell, where the wireless device may benefit from transmitting with a higher power level in order for the transmission to reach the network. Energy efficiency may be improved by ensuring that the entirety of the energy budget is used without wasting energy due to a predetermined maximum transmission power limit.

Transmit power control described herein may allow for the entire RF exposure limit to be used. The available energy may allow the UE to transmit part of the uplink bursts within the time window when the energy is very low. If the available energy for UL transmission under RF exposure limit is not enough to close the link of any single burst within the time window, no further UL transmission may happen within the time window. For certain aspects, the unused energy from a previous time interval can be saved for the transmission in the next time interval, for example, depending on how the time windows are defined for RF exposure compliance.

Figure 5:
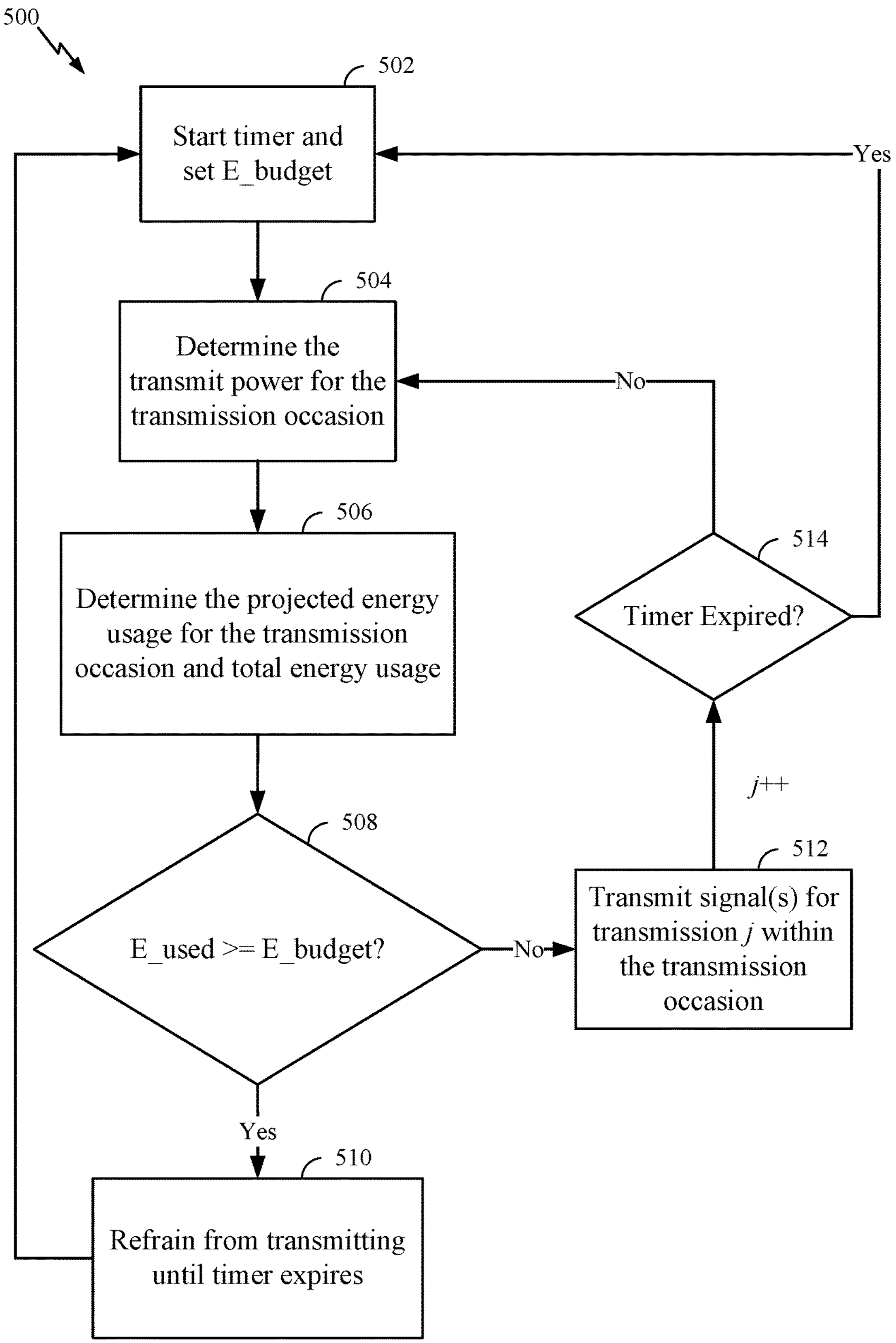
FIG. 5 is a flow diagram illustrating example operations for transmit power control by a wireless communications device, in accordance with certain aspects of the present disclosure.

FIG. 5 is a flow diagram illustrating example operations 500 for transmit power control by a wireless communications device, in accordance with certain aspects of the present disclosure. The operations 500 may be performed, for example, by a UE (e.g., the UE 120*a* in the wireless communication network 100).

The operations 500 may begin, at block 502, where the wireless device may start a timer, which may have a duration of a time window associated with a time-averaged RF exposure limit. For example, the time window may be set to ensure compliance with a time-averaged RF exposure limit, for example, as described herein with respect to FIG. 4. The wireless device may also determine an energy budget (E_budget) corresponding to the time-averaged RF exposure limit and used within the time window. For example, the wireless device may convert the time-averaged RF exposure limit (e.g., as defined by a regulatory body or by a device manufacturer based on the specifics of a device and information from a regulatory body) over the time window to the energy budget. In other examples, a regulatory body may define a total amount of energy allowed over a certain time, and this amount may be determined by the UE based on a location of the device, a frequency of operation, a disposition with respect to a user, etc. In certain cases, each type of channel (e.g., a random access channel (RACH), a PUCCH, a PUSCH, etc.) may have a separate associated energy budget (ExCH_budget, where xCH refers to the channel type). The energy budget (E_budget) may include the sum of all of the energy budgets associated with different channel types, an energy budget associated with a specific channel type, an energy budget associated with multiple channel types, or any combination thereof. The wireless device may determine available energy budgets of different uplink channels for transmission.

At block 504, the wireless device may determine a transmit power associated with a transmission occasion (e.g., TTI). For example, in response to scheduling information received from the network for an uplink transmission, the wireless device may determine the transmit power. In some cases, the wireless device may determine the transmit power in response to obtaining or generating a data payload to transmit, for example, via the RACH. The transmit power associated with the transmission occasion may represent the transmit power the UE will use in the transmission occasion. In accordance with one or more examples, when an uplink channel is scheduled for transmission, a wireless device may determine a transmit power associated with the channel or signal based on certain uplink transmit power controls. The transmit power may be determined according to one or more transmit power control procedures provided in wireless communication standards, such as 3rd Generation Partnership Project (3GPP) standards for LTE and/or NR. As an example, 3GPP Technical Specification 38.213 for 5G NR may provide a transmit power control procedure for each of the PUSCH, PUCCH, RACH, and SRS. In some cases, the transmit power may be determined based on a link budget equation as a function of pathloss. In certain wireless communication systems (e.g., LTE and/or 5G NR), the wireless device may determine the transmit power of a channel ($P_{req\_xCH}$) used to communicate with a base station according to the following expression:

$$P_{req\_xCH} = \min\left\{\begin{matrix} MTPL_{RF}, \\ P_{O\_xCH} + 10\log10\left(2^{\mu} * M_{RB}^{xCH}\right) + PL + K \end{matrix}\right\}[\text{dBm}] \tag{1}$$

where MTPL_RF is a maximum transmit power limit (e.g., a maximum output power) configured for a wireless communication network; $P_{o\_xCH}$ is the received power at the base station as configured by the network; μ is the subcarrier spacing numerology;

$$M_{RB}^{xCH}$$

is indicative of the bandwidth of the transmission (e.g., the number of resource blocks (RBs)); PL is indicative of the pathloss measured at the UE between the UE and base station; and K is an adjustment factor (e.g., configured by the network and/or a base station configured power control factor). The transmit power of the channel ($P_{req\_xCH}$) may be determined in terms of decibel-milliwatts (dBm). In some aspects, to determine the transmit power of a channel, the wireless device may select the transmit power (e.g., $P_{req\_xCH}$) as a smallest value among a transmit power limit (e.g., MTPL_RF) and a computed transmit power $$(\text{e.g., } P_{O\_xCH} + 10\log10\left(2^{\mu} * M_{RB}^{xCH}\right) + PL + K)$$

based at least in part on a pathloss (e.g., PL) between the wireless device and a receiving entity. For certain aspects, the wireless device may determine the transmit powers for a number of different channel types (e.g., RACH, PUCCH, PUSCH, etc.) that will be transmitted during the same transmission occasion. The wireless device may perform these determinations simultaneously, or one at a time.

It will be appreciated that Expression (1) is merely an example of a transmit power control expression for determining the transmit power at the UE. Other expression(s) and/or other parameters may be used in addition to or instead of Expression (1) to determine the transmit power associated with certain channels, signals, and/or RATs (e.g., LTE or 5G NR). For example, the MTPL_RF may be indicated as $P_{CMAX,f,c}(i)$ for a certain carrier f of a serving cell c in a PUSCH transmission occasion i. Further, other maximum transmit power limits may be used in addition to or instead of MTPL_RF, for example, based on a device configuration or type of power amplifier used in a transmit chain, etc. In some examples, the maximum transmit power limit includes the $P_{max}$ described above. Different channels may have different parameters and/or values configured by the network, such as K. In some cases, the adjustment factor may be representative of a function that depends on previous transmit power commands from the network.

At block 506, the wireless device may determine a projected energy usage associated with the transmission occasion. For example, the wireless device may determine the energy associated with the transmission occasion as a product of the transmit power determined at block 504 (e.g., $P_{reg\_xCH}$) and the duration of the transmission occasion. At block 506, the wireless device may also determine the energy usage for the time window. The energy usage may include the sum of the energy usage associated with the transmission occasion and the past energy usage within the time window. In certain aspects, the energy usage ($E_{xch\_used}$ (j)) for a particular channel (xch) may be determined according to the following expression:

$$E_{xch\_used}(j) = \sum_{i=0}^{j} (P_{req\_xCH,i} \cdot xchDur(i)),\ j = 0, 1, \ldots \quad (2)$$

where $P_{reg\_xCH,\ i}$ is the transmit power associated with the transmission occasion i determined at block 504; xchDur(i) is the duration of the transmission occasion i in seconds; and j is a counter associated with the total number of transmissions in the time window. When i is equal to j, the transmission occasion i is representative of the current transmission being inspected for transmit power throttling, and when i is less than j, the transmission occasion i is in the past. The energy usage associated with the transmission occasion may include the sum of the energy usage for all channel types (e.g., RACH, PUCCH, PUSCH, etc.), the energy usage for a specific channel type, or the energy usage for any combination of channel types. The past energy usage within the time window may also include the past energy usage for all channel types (e.g., RACH, PUCCH, PUSCH, etc.), the energy usage for one channel type, or the energy usage for some combination of channel types within the time window.

At block 508, the wireless device may determine if the total energy usage (E_used) satisfies the energy budget. For example, the wireless device may determine whether the energy usage (E_used) is greater than or equal to the energy budget (E_budget). In some aspects, the wireless device may perform the activities described herein with respect to blocks 504-508 before the wireless device is scheduled to transmit in the transmission occasion. As described above, the energy usage (E_used) may be the sum of the energy usage for each channel type in the transmission occasion, the energy usage for a specific channel type, or the energy usage for some combination of channel types. Further, the energy budget (E_budget) may be the sum of all various energy budgets associated with different channel types, an energy budget associated with a specific channel type, an energy budget associated with multiple channel types, or any combination thereof. The channel types may be associated with a single RAT, multiple RATs, one antenna or antenna array, a group of antennas and/or antenna arrays, or a non-grouped plurality (e.g., all) of antennas and/or antenna arrays.

If the wireless device determines there is not enough energy budget for the transmission, then the wireless device may refrain from transmitting (including the transmission associated with the transmit power determined for the current transmission occasion) until the timer expires. For example, if the energy usage (E_used) is greater than or equal to the energy budget (E_budget), then the operations 500 may proceed to block 510, where the wireless device may refrain from transmitting until the time remaining in the time window expires, for example, based on the timer set at block 502. When the timer expires, the operations 500 may then proceed to block 502, where the wireless device restarts the timer beginning a new time window and resets the past energy usage, for example, to zero. In certain cases, the wireless device may reset the energy budget (E_budget).

If the wireless device determines there is enough energy budget for the transmission, then the wireless device may transmit during the transmission occasion. For example, if the energy usage (E_used) is less than the energy budget (E_budget), then the operations 500 may proceed to block 512, where the wireless device may transmit signal(s) at the transmit power determined at block 504 in the transmission occasion (j).

At block 514, the wireless device may determine whether the timer has expired. The wireless device may also increment the counter (j) associated with the total number of transmissions in the time window by one. If the timer has expired, then the operations 500 may proceed to block 502, where the wireless device may restart the timer and reset the past energy usage, for example, to zero. If the timer has not expired, then the operations 500 may proceed to block 504, where the wireless device may determine the transmit power for the next transmission occasion, for example, in response to scheduling or obtaining a transmission payload. It will be appreciated that due to the energy budget being set to a value in compliance with an RF exposure limit, such as a time-averaged SAR and/or MPE limit, the operations 500 may ensure that RF emissions from the wireless device are in compliance with the respective RF exposure limit.

It will be appreciated that the use of a timer in the operations 500 is merely an example. Other techniques for determining the expiration of the time window associated with the time-averaged RF exposure limit may be used. For example, the wireless device may count the number of transmission occasions occurring over time and check if the number of transmission occasions is less than or equal to a threshold, where the threshold corresponds to the duration of the time-averaging time window.

Figure 6:
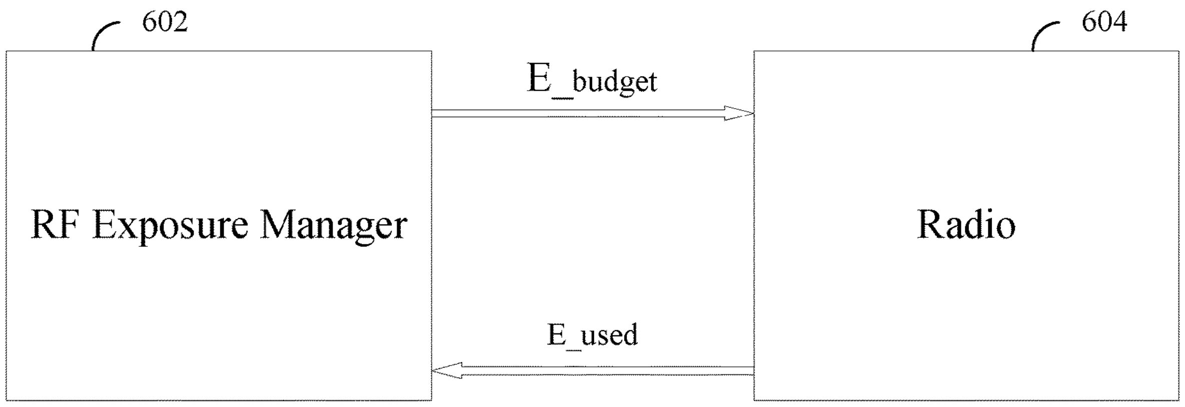
FIG. 6 is a diagram of an example interaction between an RF exposure manager and a radio, in accordance with certain aspects of the present disclosure.

FIG. 6 is a diagram of an example interaction between an RF exposure manager and a radio, in accordance with certain aspects of the present disclosure. A wireless device (e.g., UE 120) may include an RF exposure manager 602 and a radio 604. The RF exposure manager 602 may be representative of the RF exposure manager 122, 281. The RF exposure manager 602 may determine the energy budget (E_budget) in compliance with an RF exposure limit, for example, as described herein with respect to the operations 500. The RF exposure manager 602 may also determine the energy budget for some combination of channel types (e.g., RACH, PUCCH, PUSCH, etc.). For certain aspects, the RF exposure manager 602 may provide the energy budget (E_budget) to the radio 604, which may be representative of the RF transceiver circuit 300.

The radio 604 may perform medium access control (MAC) functions, such as determining the scheduling for uplink transmissions. The radio 604 may accumulate the actual energy used at the wireless device and may compare the energy used to the energy budget. The radio 604 may throttle transmissions when the projected energy usage is greater than the energy budget, for example, as described herein with respect to blocks 508, 510 of the operations 500. The radio 604 may determine whether to transmit a transmission, for example, according to the operations 500, in response to uplink scheduling or obtaining a transmission payload, for example, for a RACH transmission.

In certain aspects, the RF exposure manager 602 may prioritize an energy budget associated with each of one or more specific channels (e.g., RACH, PUCCH, and/or PUSCH). For example, the RF exposure manager 602 may allocate more of the energy budget to PUSCH transmissions than to PUCCH transmission, or vice versa. The wireless device may allocate parts of the energy budget (E_budget) to certain channel(s) in accordance with the channel prioritization, and the wireless device may allocate the remaining energy budget (E_budget) to other channels. The energy budget prioritization may be based on channel conditions, traffic history, service type, quality of service settings, etc. The radio 604 may provide the energy usage—for example, as determined according to Expression (2)—to the RF exposure manager 602. The RF exposure manager 602 may adjust the energy budget assigned to certain channels based on the energy usage obtained from the radio 604.

Figure 7:
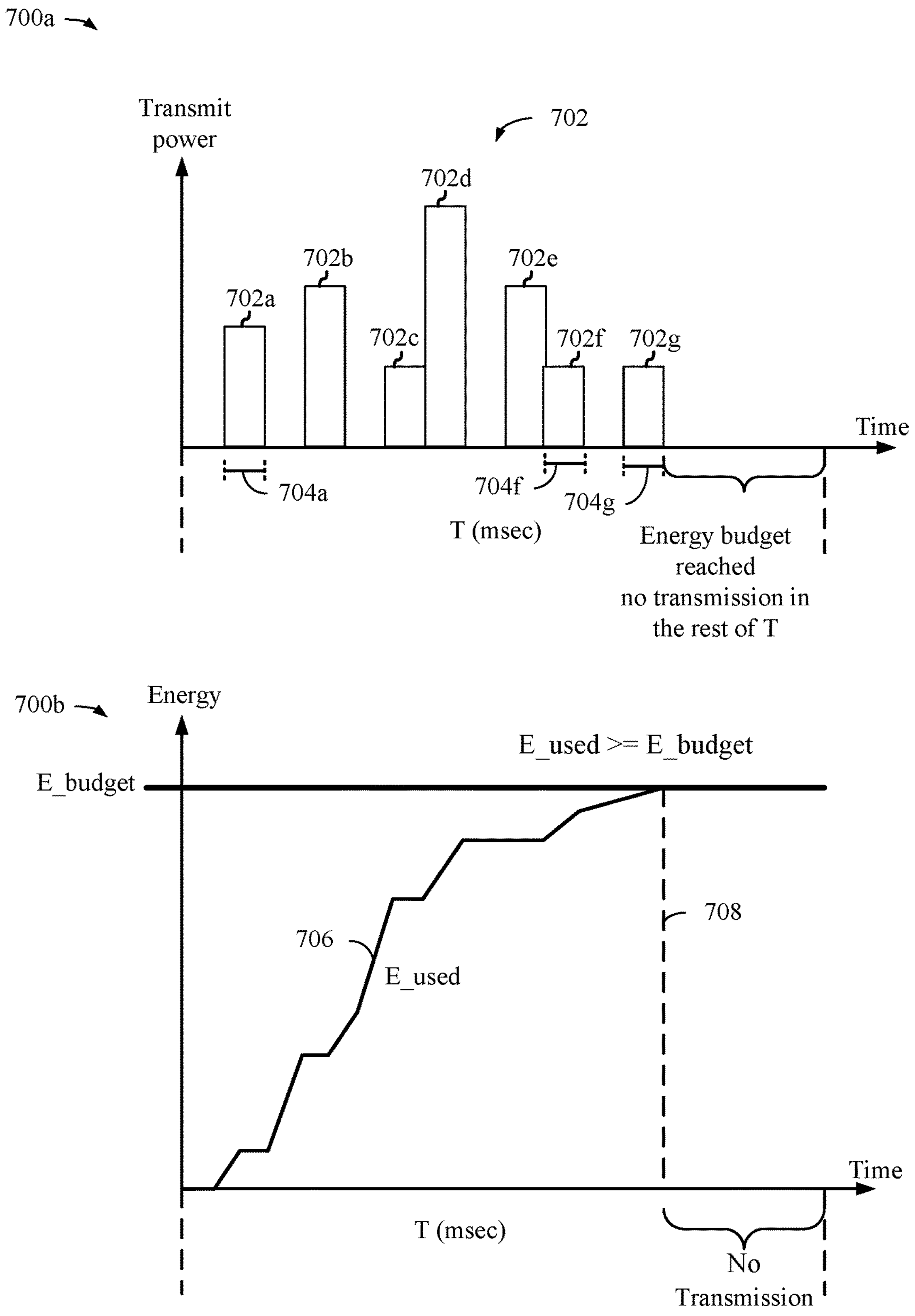
FIG. 7 includes a graph illustrating an example of energy usage with relatively bursty transmission over a transmission occasion in compliance with, but reaching, an energy budget before an end of the transmission occasion and a corresponding graph illustrating energy usage accumulation, in accordance with certain aspects of the present disclosure.

FIG. 7 includes graphs 700*a*, 700*b* illustrating an example of transmit power control over multiple transmission occasions in compliance with an energy budget, in accordance with certain aspects of the present disclosure. In this example, a wireless device may transmit multiple signal bursts in respective transmission occasions 704*a* to 704*g* across a time window (T), such as the time window described herein with respect to FIG. 4. In graph 700*a*, multiple transmit powers 702*a* to 702*g* (collectively referred to as "transmit powers 702") associated with the signal bursts are depicted over time within the time window (T). The wireless device may determine the transmit power for each of the signal bursts in the respective transmission occasions 704, for example, as described herein with respect to FIG. 5. As an example, before transmission occasion 704*g*, the wireless device may determine the transmit power 702*g* for the respective signal burst according to transmit power control procedure(s) for the respective channel(s) of the signal burst, such as Expression (1). The wireless device may convert the transmit power 702*g* to an energy usage, for example, as described herein with respect to the operations 500, e.g., according to Expression (2). The wireless device may determine whether there is enough energy budget for the transmission in transmission occasion 704*g* based on the past energy usage associated with transmission occasions 704*a* to 704*f* and the projected energy usage associated with the transmission occasion 704*g*. In this example, the energy usage associated with the transmission occasion 704*g* may satisfy the energy budget. After the transmission occasion 704*g*, the wireless device may apply transmit power throttling (e.g., refrain from transmitting during the remainder of the transmission occasion).

In graph 700*b*, the curve 706 is representative of the cumulative energy usage of the signal bursts over time. As shown, the energy usage (E_used) reaches the energy budget (E_budget) at a particular time 708, which, in this example, is before the end of the time window (T). The energy usage may reach the energy budget at the time 708, for example, due to a future transmission (e.g., scheduled or triggered at will) adding to the energy usage, for example, as described herein with respect to the operations 500. In response to the energy usage reaching the energy budget at the time 708, the wireless device may refrain from transmitting for the remainder of the time window. After the energy budget (E_budget) is reached, there may be no transmission for the remainder of the time window, in order to guarantee RF exposure compliance.

It will be appreciated that the operations described herein facilitate RF exposure compliance with an energy budget instead of $P_{limit}$. The operations described herein allow for RF exposure compliance without time-averaging past RF exposure. FIG. 7 demonstrates that the wireless device is able to transmit at various transmit powers in the transmission occasions throughout the time window. The wireless device may allow the energy budget to be reached before the end of the time window.

Figure 8:
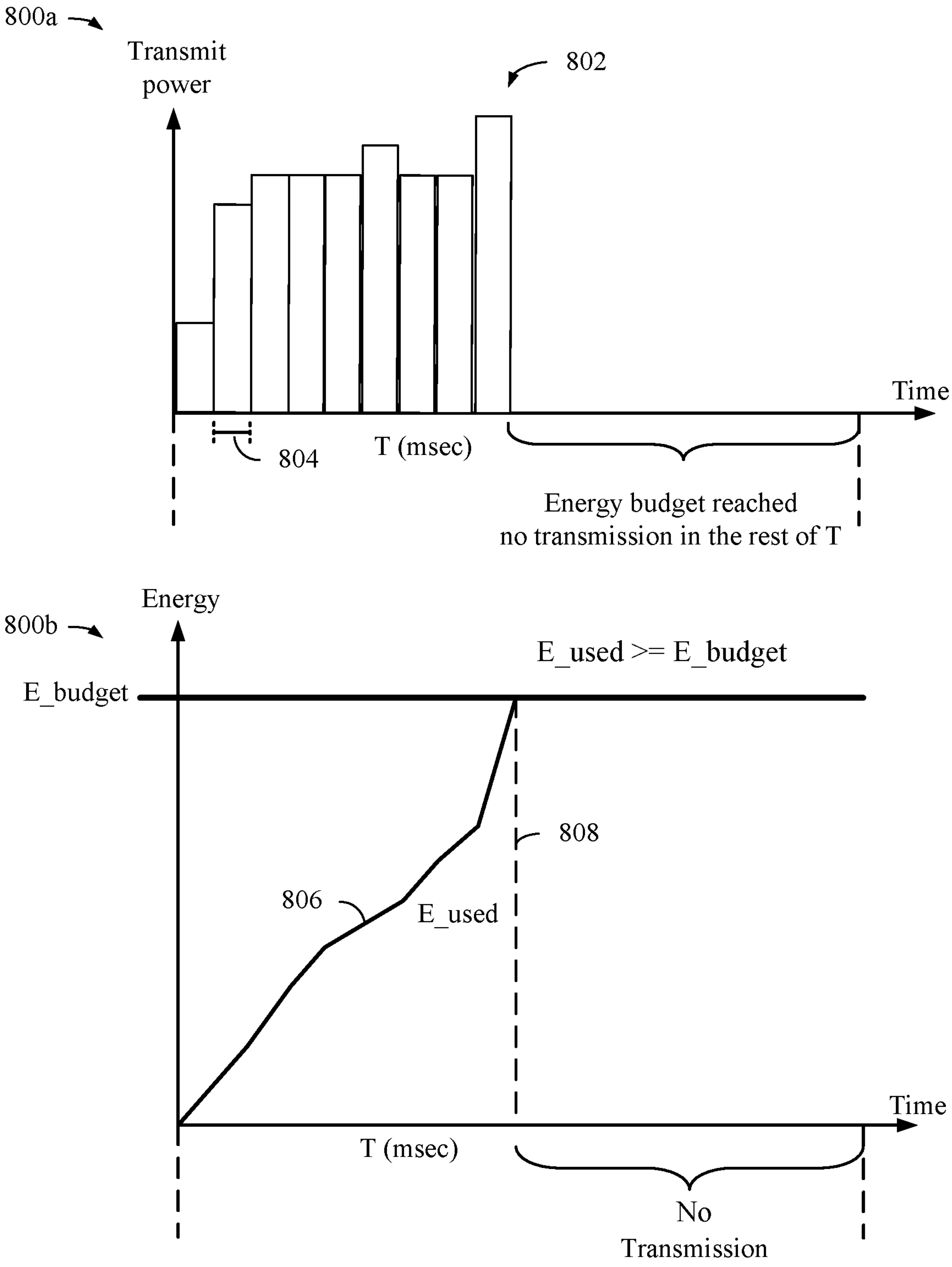
FIG. 8 includes a graph illustrating an example of energy usage with relatively continuous transmission over a transmission occasion in compliance with, but reaching, an energy budget before an end of the transmission occasion and a corresponding graph illustrating energy usage accumulation, in accordance with certain aspects of the present disclosure.

FIG. 8 includes graphs 800*a*, 800*b* illustrating an example of transmit power control over multiple transmission occasions in compliance with an energy budget, in accordance with certain aspects of the present disclosure. In this example, a wireless device may transmit multiple signal bursts in respective transmission occasions 804 as described herein with respect to FIG. 7. In graph 800*a*, multiple transmit powers 802 associated with the signal bursts are depicted over time within the time window (T). The wireless device may determine the transmit power for each of the signal bursts in the respective transmission occasions 804, for example, as described herein with respect to FIG. 5. In graph 800*b*, the curve 806 is representative of the cumulative energy usage of the signal bursts over time. As shown, the energy usage (E_used) reaches the energy budget (E_budget) at a particular time 808, which, in this example, is before the end of the time window (T). The energy usage may reach the energy budget at the time 808, for example, due to a future transmission (e.g., scheduled or triggered at will) adding to the energy usage, for example, as described herein with respect to the operations 500. In this example, the signal bursts may be transmitted contiguously without any time gaps between the signal bursts. As a result, the energy usage may reach the energy budget at a faster rate compared to the energy usage depicted in FIG. 7, for example.

Figure 9:
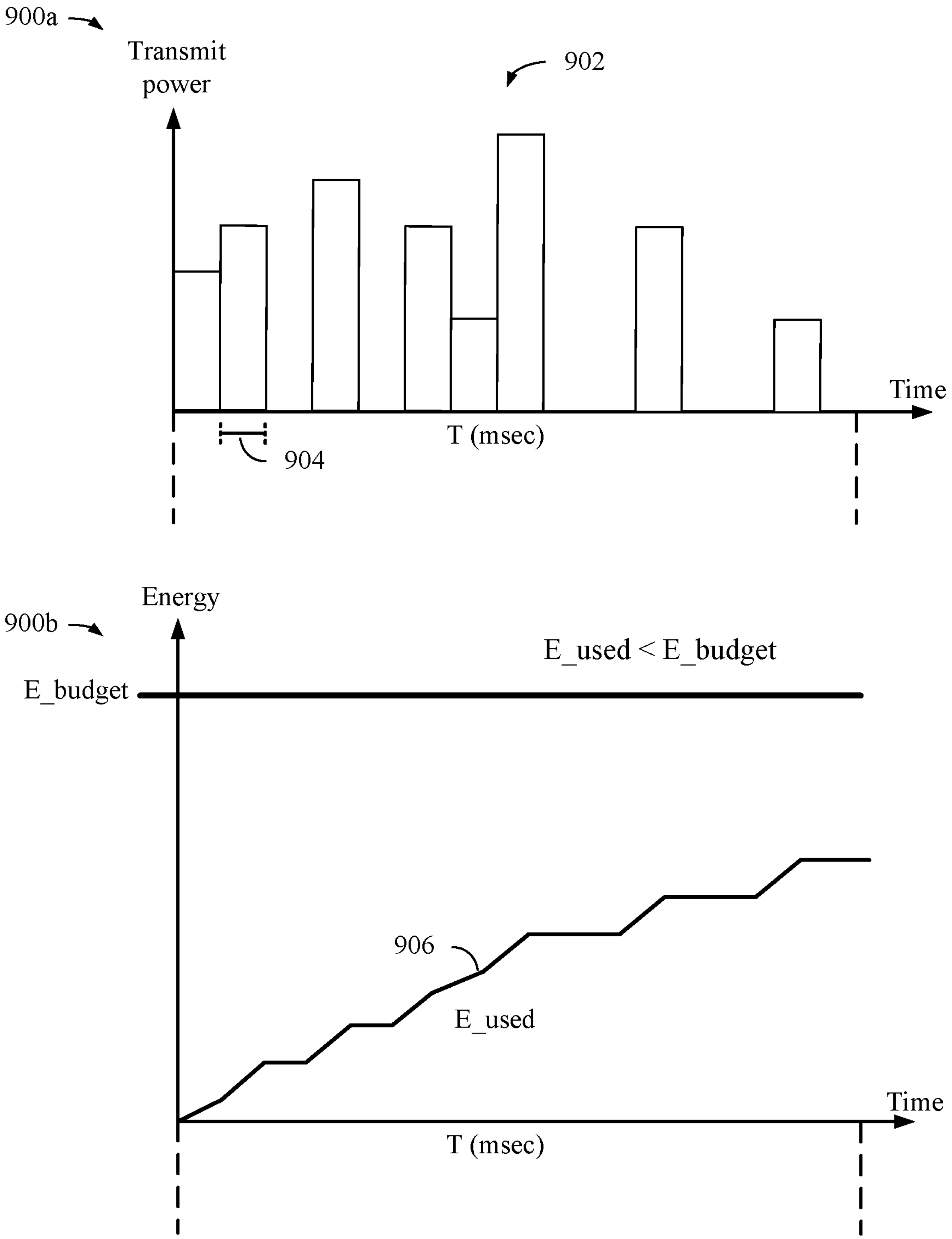
FIG. 9 includes a graph illustrating an example of energy usage with relatively bursty transmission over a transmission occasion in compliance with an energy budget and a corresponding graph illustrating energy usage accumulation, in accordance with certain aspects of the present disclosure.

FIG. 9 includes graphs 900*a*, 900*b* illustrating an example of transmit power control over multiple transmission occasions in compliance with an energy budget, in accordance with certain aspects of the present disclosure. In this example, a wireless device may transmit multiple signal bursts in respective transmission occasions 904 as described herein with respect to FIG. 7. In graph 900*a*, multiple transmit powers 902 associated with the signal bursts are depicted over time within the time window (T). The wireless device may determine the transmit power for each of the signal bursts in the respective transmission occasions 904, for example, as described herein with respect to FIG. 5. In graph 900*b*, the curve 906 is representative of the cumulative energy usage of the signal bursts over time. As shown, the energy usage (E_used) does not reach the energy budget (E_budget) before the end of the time window (T). As a result, the wireless device may be allowed to transmit throughout the time window without the transmit power throttling described herein.

Figure 10:
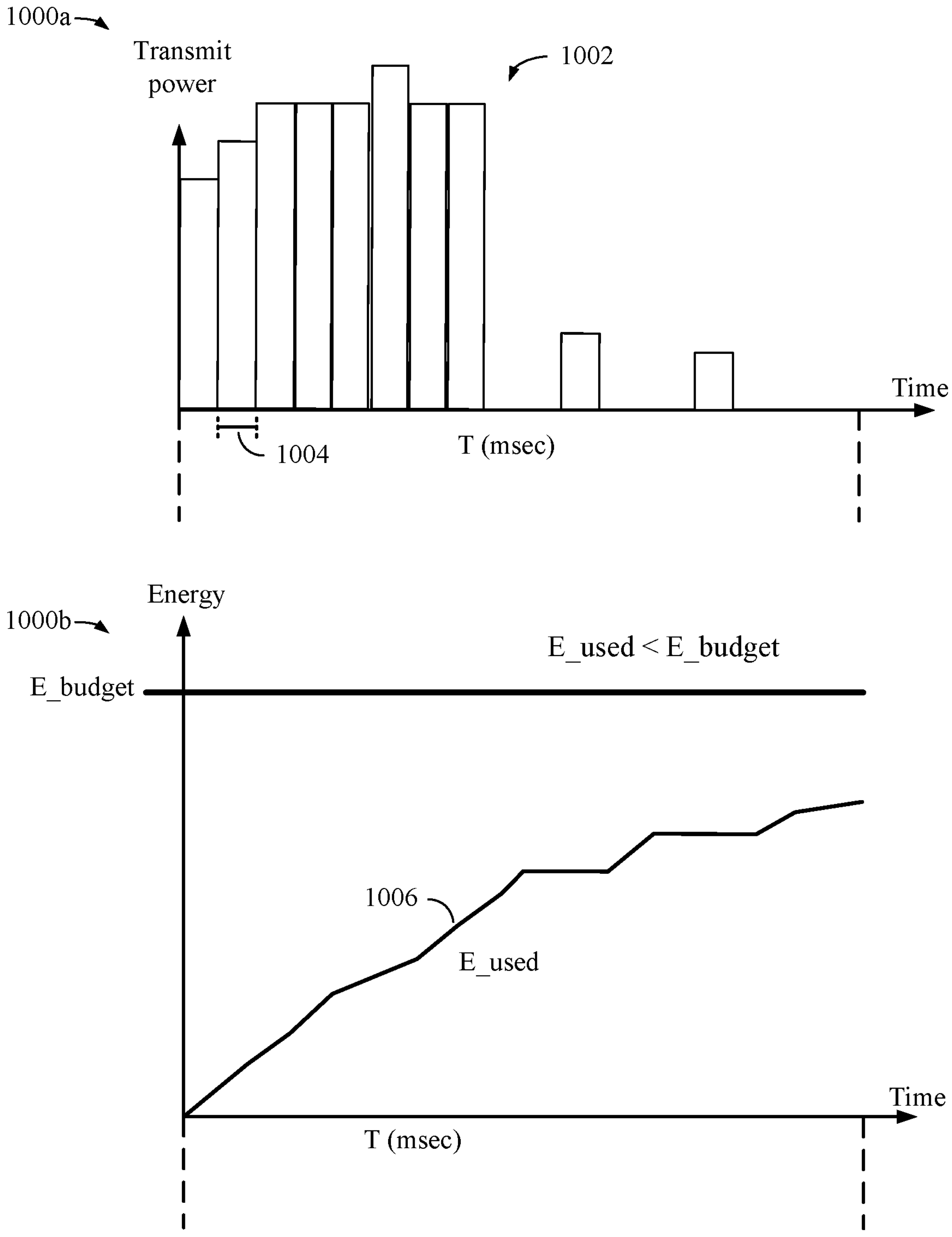
FIG. 10 includes a graph illustrating an example of energy usage with relatively continuous transmission over a transmission occasion in compliance with an energy budget and a corresponding graph illustrating energy usage accumulation, in accordance with certain aspects of the present disclosure.

FIG. 10 includes graphs 1000*a*, 1000*b* illustrating an example of transmit power control over multiple transmission occasions in compliance with an energy budget, in accordance with certain aspects of the present disclosure. In this example, a wireless device may transmit multiple signal bursts in respective transmission occasions 1004 as described herein with respect to FIG. 7. In graph 1000*a*, multiple transmit powers 1002 associated with the signal bursts are depicted over time within the time window (T). The wireless device may determine the transmit power for each of the signal bursts in the respective transmission occasions 1004, for example, as described herein with respect to FIG. 5. In graph 1000*b*, the curve 1006 is representative of the cumulative energy usage of the signal bursts over time. As shown, the energy usage (E_used) does not reach the energy budget (E_budget) before the end of the time window (T). As a result, the wireless device may be allowed to transmit throughout the time window without the transmit power throttling described herein. Note that the transmit powers 1002 appear higher than the transmit powers 802 (FIG. 8), but the transmit power scale may not be similar between the two figures and/or the energy budget (E_budget) in FIG. 10 may be greater than in FIG. 8.

It will be appreciated that each of the examples depicted in FIGS. 8-10 may be representative of an energy budget allocated to a particular channel (e.g., RACH, PUCCH, PUSCH, etc.) and/or an energy budget associated with a combination of channels. For example, the transmit power behavior depicted in FIG. 8 may be representative of the energy budget allocated to the PUSCH, whereas the transmit power behavior depicted in FIG. 10 may be representative of the energy budget allocated to the RACH. In certain cases, the wireless device may adjust the energy budget allocation associated with one or more channels in response to certain events and/or periodically. For example, the wireless device may detect that the energy usage for RACH transmissions is not reaching the allocated energy budget for a certain number of time window(s). In response to such a detection, the wireless device may reduce the energy budget allocated for RACH transmissions and correspondingly increase the energy budget allocated for PUSCH transmissions.

It will be appreciated that the time-averaged RF exposure compliance operations described herein with respect to FIGS. 5-10 are merely examples. In certain aspects, the wireless device may apply an energy budget per one or more transmission time intervals (e.g., one or more slots, radio frames, or transmission occasions), where the energy budget may correspond to $P_{limit}$ across the one or more transmission time intervals. In some examples, the energy budget may vary between time intervals, and/or may be allocated by a RF exposure manager (e.g., the RF exposure manager 602) at each time interval or at periodic time intervals. The wireless device may transmit at specified transmit power(s) in transmission occasion(s) until the energy budget for the one or more transmission time intervals is reached as described herein with respect to FIGS. 5-10. The specified transmit power(s) may be determined according to a transmit power control procedure, for example, as described herein with respect to FIG. 5. The time windows (T) depicted in FIGS. 7-10 may be representative of a duration corresponding to one or more transmission time intervals (e.g., one or more slots or radio frames). The wireless device may perform the time-averaged RF exposure evaluation per transmission occasion in the one or more transmission time intervals. In some cases, the wireless device may evaluate if a portion of a transmission occasion (e.g., each symbol) satisfies the energy budget. For example, the wireless device may transmit at the specified transmit power per symbol of a transmission occasion until the energy budget is reached for the one or more transmission time intervals.

Figure 11:
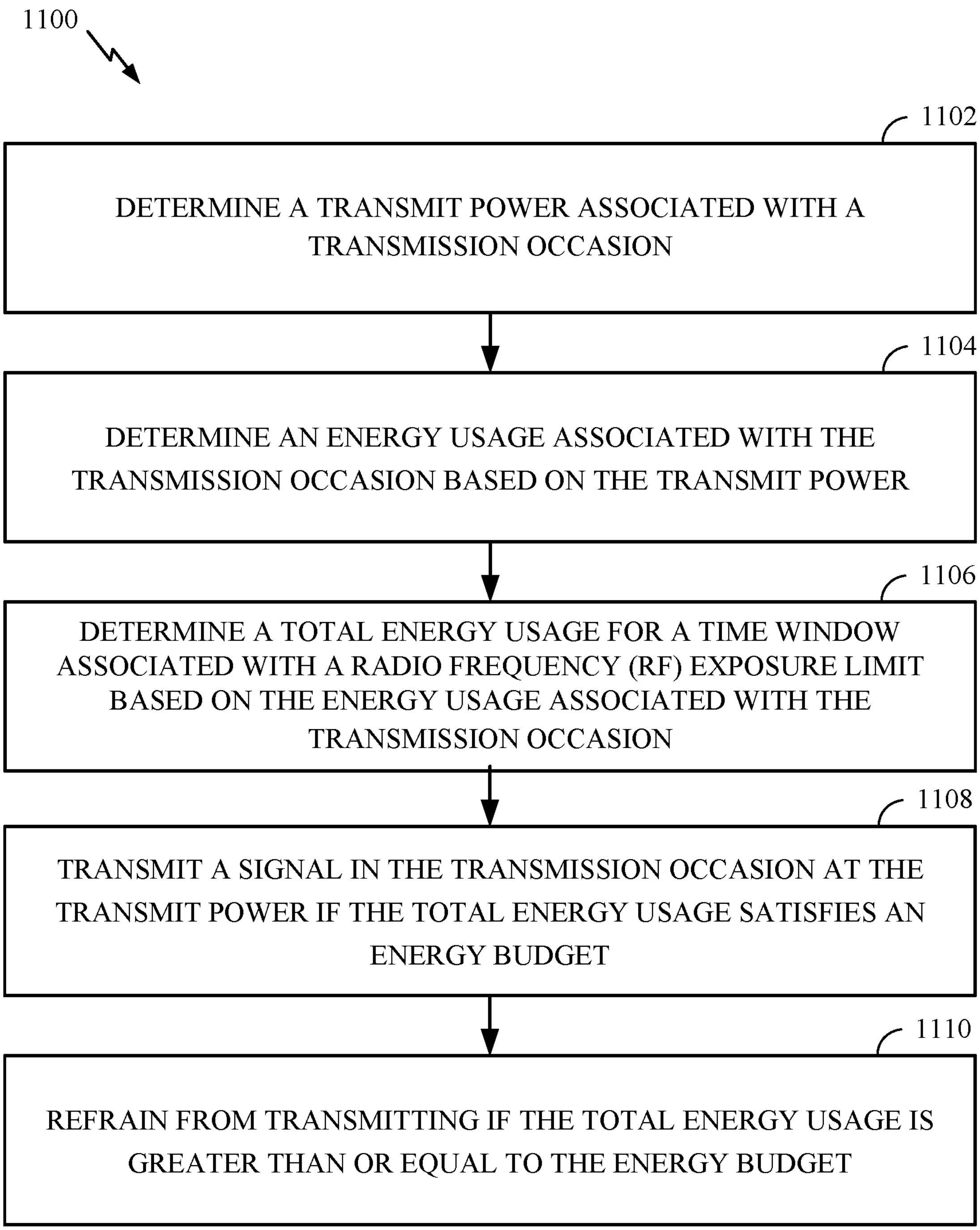
FIG. 11 is a flow diagram illustrating example operations for wireless communication by a wireless device, in accordance with certain aspects of the present disclosure.

FIG. 11 is a flow diagram illustrating example operations 1100 for wireless communication, in accordance with certain aspects of the present disclosure. The operations 1100 may be performed, for example, by a wireless device (e.g., the UE 120*a* in the wireless communication network 100). The operations 1100 may be implemented as software components that are executed and run on one or more processors (e.g., controller/processor 280 of FIG. 2). Further, the transmission and/or reception of signals by the wireless device in the operations 1100 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 1100 may optionally begin, at block 1102, where the wireless device may determine a transmit power (e.g., the transmit power 702*g*) associated with a transmission occasion (e.g., the transmission occasion 704*g*). For example, the wireless device may determine the transmit power associated with a transmission occasion as described herein with respect to FIGS. 5 and 6. The transmit power may be the transmit power of a number of different channel types (e.g., RACH, PUCCH, PUSCH, etc.) and the determining of the transmit power may include summing the power of multiple channel types in a transmission occasion.

At block 1104, the wireless device may determine an energy usage (e.g., a portion of the energy usage in the curve 706) associated with the transmission occasion based on the transmit power. For example, the wireless device may determine the energy usage associated with a transmission occasion as described herein with respect to FIGS. 5 and 6. The energy usage may be sum of the energy usage for a number of different channel types (e.g., RACH, PUCCH, PUSCH, etc.) and determining the energy usage may include summing the energy usage for transmission occasion j for each channel type, for a specific channel type, or for some combination of channel types.

At block 1106, the wireless device may determine a total energy usage for a time window (e.g., the time window (T) depicted in FIG. 7) associated with a RF exposure limit based on the energy usage associated with the transmission occasion. For example, the wireless device may determine the total energy usage for a time window as described herein with respect to FIGS. 5 and 6. In certain aspects, the total energy usage may comprise the energy usage associated with the transmission occasion and past energy usage within the time window, as described herein with respect to FIG. 5. Referring to Expression (2), the total energy usage may be determined by summing the energy usage associated the transmission occasion j and the past energy usage (e.g., the energy usage associated with transmission occasion (i=0) through transmission occasion (i=j−1)) within the time window. For certain aspects, the past energy usage within the time window may also include the past energy usage for all channel types (e.g., RACH, PUCCH, PUSCH, etc.), the energy usage for a specific channel type, or the energy usage for some combination of channel types within the time window.

At block 1108, the wireless device may transmit a signal in the transmission occasion at the transmit power if the total energy usage satisfies an energy budget (e.g., E_budget as depicted in FIG. 7), for example, as described herein with respect to FIGS. 5-10. The energy budget may be the sum of all of the energy budgets that are associated with different channels or any combination thereof. The energy budget may also be an energy budget associated with a specific channel type. For certain aspects, the wireless device may continue to transmit signals until the total energy usage is greater than or equal to the energy budget, for example, as depicted in FIGS. 9 and 10.

At block 1110, the wireless device may refrain from (e.g., pause from or temporarily stop) transmitting if the total energy usage does not satisfy the energy budget. The wireless device may refrain from transmitting if the total energy usage is greater than or equal to the energy budget, for example, as described herein with respect to FIGS. 5 and 6. For certain aspects, in response to detecting that the total energy usage does not satisfy the energy budget, the wireless device may refrain from transmitting until a timer associated with the time window expires, such as the timer described herein with respect to FIG. 5.

For certain aspects, the wireless device may set the total energy usage to a value when a timer associated with the time window expires, and the wireless device may restart the timer in response to the timer expiring, as described herein with respect to FIG. 5. For example, the total energy usage may be set to zero when the timer expires.

In certain aspects, the wireless device may transmit a signal in the transmission occasion at the transmit power via a channel (e.g., RACH, PUCCH, PUSCH, etc.) if the energy usage satisfies the energy budget. For certain aspects, the energy budget may be associated with the channel. The channel may include a RACH, a PUCCH, a PUSCH, or any combination thereof. The energy budget may be allocated for the channel. For example, the energy budget may be allocated for the RACH or PUCCH.

In certain aspects, the wireless device may allocate an energy budget to multiple channels. The wireless device may determine, for each of multiple channels, a channel-specific energy budget. The multiple channels may include any combination of channel types (e.g., RACH, PUCCH, PUSCH, etc.). For certain aspects, the energy budget may include at least one of the channel-specific energy budgets, as described herein with respect to FIG. 5.

For certain aspects, to determine the transmit power, the wireless device may determine the transmit power for at least one of the channels associated with the energy budget. For example, the wireless device may determine the transmit power for each channel type (e.g., RACH, PUCCH, PUSCH, etc.). The wireless device may perform these determinations simultaneously, or one at a time. As described above, each channel type may have its own energy budget.

In certain aspects, to determine the channel-specific energy budget, the wireless device may allocate a portion of a total energy budget as the respective channel-specific energy budget for each of the channels. As an example, the energy budget in FIG. 7 may be representative of the total energy budget, and each of the energy budgets in FIGS. 8-10 may be representative of a portion of the total energy budget as the respective channel-specific energy budget for each of the channels. The wireless device may prioritize some channels (e.g., RACH, PUCCH) over others as determined by a per-signal type channel prioritization. The wireless device may allocate parts of the energy budget to certain channels in accordance with the prioritization. For example, the wireless device may allocate a first portion of the total energy budget to PUSCH transmissions, a second portion of the total energy budget to PUCCH transmissions, and a third portion of the total energy budget to RACH transmissions. In certain aspects, the wireless device may allocate portions of the total energy budget to different radios, such as LTE, 5G NR, Bluetooth, WiFi, etc. The wireless device may allocate portions of the total energy budget to different subscriptions, for example, for a multi-subscription device (e.g., via multiple subscriber identity modules (SIMs) or universal SIMs (USIMs)). Some multi-SIM configurations enable multiple subscriptions to be active at a time, allowing communications at any given time with multiple transceivers, such as Dual SIM Dual Active (DSDA). As an example, the wireless device may allocate first portion of the total energy budget to a first subscription and a second portion of the total energy budget to a second subscription.

For certain aspects, the wireless device may determine the transmit power based on a power control procedure, such as the power control procedures for LTE and/or 5G NR. In certain aspects, the power control procedure may be for uplink communication, sidelink communication, or both.

For certain aspects, to determine the transmit power, the wireless device may select the transmit power as a smallest value among a transmit power limit and a computed transmit power based at least in part on a pathloss between the wireless device and a receiving entity, for example, as described herein with respect to Expression (1). For example, the wireless device may select the transmit power limit if the computed transmit power is larger. In some cases, the wireless device may select the computed transmit power if the transmit power limit is larger. In certain aspects, to determine the transmit power, the wireless device may determine the computed transmit power further based at least in part on an estimated received power at the receiving entity (e.g., the BS 110), a subcarrier spacing numerology associated with the signal, a bandwidth associated with the signal, and the pathloss, for example, as described herein with respect to FIG. 5.

For certain aspects, to determine the transmit power, the wireless device may determine the transmit power based on a pathloss between the wireless device and a receiving entity (e.g., the BS 110). In some cases, instead of relying on the transmit power control procedure(s) described herein, the wireless device may determine the transmit power to facilitate reception at the receiving entity based on the measured pathloss between the wireless device and the receiving entity.

While the examples depicted in FIGS. 1-11 are described herein with respect to a UE performing the various methods for providing RF exposure compliance to facilitate understanding, aspects of the present disclosure may also be applied to other wireless devices, such as a wireless station, an access point, a base station and/or a CPE, performing the RF exposure compliance described herein. Further, while the examples are described with respect to communication between the UE (or other wireless device) and a network entity, the UE or other wireless device may be communicating with a device other than a network entity, for example another UE or with another device in a user's home that is not a network entity, for example.

It will be appreciated that the transmit power control described herein may enable desirable wireless communication performance, such as reduced latencies, increased uplink data rates, and/or an uplink connection at the edge of a cell.

Example Communications Device

Figure 12:
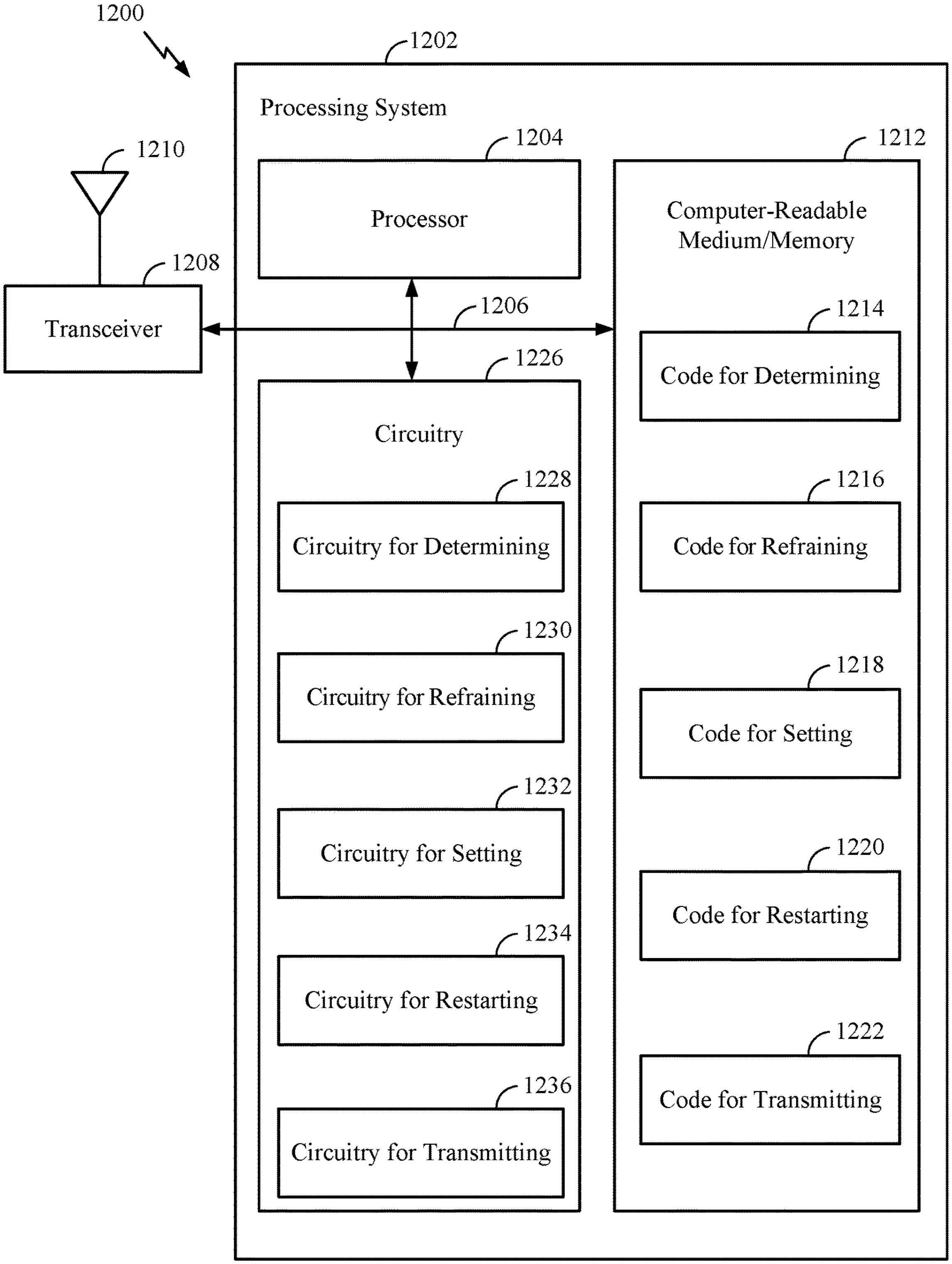
FIG. 12 illustrates a communications device (e.g., a UE) that may include various components configured to perform operations for the techniques disclosed herein, in accordance with certain aspects of the present disclosure.

FIG. 12 illustrates a communications device 1200 (e.g., the UE 120) that may include various components (e.g., corresponding to means-plus-function components) configured to perform operations for the techniques disclosed herein, such as the operations illustrated in FIG. 11. The communications device 1200 includes a processing system 1202, which may be coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the communications device 1200 to perform the operations 1100 illustrated in FIG. 11, or other operations for performing the various techniques discussed herein for providing RF exposure compliance. In certain aspects, computer-readable medium/memory 1212 stores code for determining 1214, code for refraining 1216, code for setting 1218, code for restarting 1220, code for transmitting (or providing) 1222, or any combination thereof.

In certain aspects, the processing system 1202 has circuitry 1226 configured to implement the code stored in the computer-readable medium/memory 1212. In certain aspects, the circuitry 1226 is coupled to the processor 1204 and/or the computer-readable medium/memory 1212 via the bus 1206.

For example, the circuitry 1226 includes circuitry for determining 1228, circuitry for refraining 1230, circuitry for setting 1232, circuitry for restarting 1234, circuitry for transmitting (or providing) 1236, or any combination thereof.

In some examples, means for transmitting or sending (or means for outputting for transmission) may include the transceivers 232 and/or antenna(s) 234 of the BS 102 illustrated in FIG. 2 and/or transceiver 1008 and antenna 1210 of the communication device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for refraining, means for setting, and/or means for restarting may include various processing system components, such as: the one or more processors 1204 in FIG. 12, or aspects of the BS 102 depicted in FIG. 2, including receive processor 238, transmit processor 220, TX MIMO processor 230, and/or controller/processor 240.

EXAMPLE ASPECTS

Implementation examples are described in the following numbered clauses:

Aspect 1: A method of wireless communication by a wireless device, comprising: determining a transmit power associated with a transmission occasion; determining an energy usage associated with the transmission occasion based on the transmit power; determining a total energy usage for a time window or a time interval associated with a radio frequency (RF) exposure limit based on the energy usage associated with the transmission occasion; and transmitting a signal in the transmission occasion at the transmit power if the total energy usage satisfies an energy budget.

Aspect 2: The method of Aspect 1, wherein determining the total energy usage comprises determining a sum of the energy usage associated with the transmission occasion and past energy usage within the time window or the time interval.

Aspect 3: The method of Aspect 1 or 2, further comprising refraining from transmitting in the time window or the time interval if the total energy usage is greater than or equal to the energy budget.

Aspect 4: The method according to any of Aspects 1-3, further comprising: setting the total energy usage to a value when a timer associated with the time window or the time interval expires; and restarting the timer in response to the timer expiring.

Aspect 5: The method of Aspect 4, wherein the value is equal to zero.

Aspect 6: The method according to any of Aspects 1-5, wherein transmitting the signal comprises transmitting the signal in the transmission occasion at the transmit power via a channel if the total energy usage satisfies the energy budget, wherein the energy budget is associated with the channel.

Aspect 7: The method of Aspect 6, wherein the channel includes a random access channel, a physical uplink control channel, a physical uplink shared channel, or any combination thereof.

Aspect 8: The method of Aspect 6 or 7, further comprising: determining, for each of a plurality of channels, a channel-specific energy budget, wherein the energy budget includes at least one of the channel-specific energy budgets and wherein determining the transmit power comprises determining the transmit power for at least one of the channels associated with the energy budget.

Aspect 9: The method of Aspect 8, wherein determining the channel-specific energy budget comprises allocating a portion of a total energy budget as the respective channel-specific energy budget for each of the channels.

Aspect 10: The method according to any of Aspects 1-9, wherein determining the transmit power comprises determining the transmit power based on a power control procedure.

Aspect 11: The method of Aspect 10, wherein the power control procedure is for uplink communication or sidelink communication.

Aspect 12: The method according to any of Aspects 1-11, wherein determining the transmit power comprises selecting the transmit power as a smallest value among a transmit power limit and a computed transmit power based at least in part on a pathloss between the wireless device and a receiving entity.

Aspect 13: The method of Aspect 12, wherein determining the transmit power comprises determining the computed transmit power further based at least in part on an estimated received power at the receiving entity, a subcarrier spacing numerology associated with the signal, a bandwidth associated with the signal, and the pathloss.

Aspect 14: The method according to any of Aspects 1-13, wherein determining the transmit power comprises determining the transmit power based on a pathloss between the wireless device and a receiving entity.

Aspect 15: An apparatus for wireless communication, comprising: one or more memories collectively storing executable instructions; and one or more processors coupled to the one or more memories, the one or more processors being collectively configured to execute the executable instructions to cause the apparatus to: determine a transmit power associated with a transmission occasion, determine an energy usage associated with the transmission occasion based on the transmit power, determine a total energy usage for a time window or a time interval associated with a radio frequency (RF) exposure limit based on the energy usage associated with the transmission occasion, and transmit a signal in the transmission occasion at the transmit power if the total energy usage satisfies an energy budget.

Aspect 16: The apparatus of Aspect 15, wherein to determine the total energy usage, one or more processors are collectively configured to execute the executable instructions to cause the apparatus to determine a sum of the energy usage associated with the transmission occasion and past energy usage within the time window or the time interval.

Aspect 17: The apparatus of Aspect 15 or 16, wherein the one or more processors are further collectively configured to execute the executable instructions to cause the apparatus to refrain from transmitting in the time window or the time interval if the total energy usage is greater than or equal to the energy budget.

Aspect 18: The apparatus according to any of Aspects 15-17, wherein the one or more processors are further collectively configured to execute the executable instructions to cause the apparatus to: set the total energy usage to a value when a timer associated with the time window expires or the time interval; and restart the timer in response to the timer expiring.

Aspect 19: The apparatus of Aspect 18, wherein the value is equal to zero.

Aspect 20: The apparatus according to any of Aspects 15-19, wherein to transmit the signal, the one or more processors are collectively configured to execute the executable instructions to cause the apparatus to transmit the signal in the transmission occasion at the transmit power via a channel if the total energy usage satisfies the energy budget, and wherein the energy budget is associated with the channel.

Aspect 21: The apparatus of Aspect 20, wherein the channel includes a random access channel, a physical uplink control channel, a physical uplink shared channel, or any combination thereof.

Aspect 22: The apparatus of Aspect 20 or 21, wherein the one or more processors are further collectively configured to execute the executable instructions to cause the apparatus to: determine, for each of a plurality of channels, a channel-specific energy budget, wherein the energy budget includes at least one of the channel-specific energy budgets, and determine the transmit power for at least one of the channels associated with the energy budget.

Aspect 23: The apparatus of Aspect 22, wherein to determine the channel-specific energy budget, the one or more processors are collectively configured to execute the executable instructions to cause the apparatus to allocate a portion of a total energy budget as the respective channel-specific energy budget for each of the channels.

Aspect 24: The apparatus according to any of Aspects 15-23, wherein to determine the transmit power, the one or more processors are collectively configured to execute the executable instructions to cause the apparatus to determine the transmit power based on a power control procedure.

Aspect 25: The apparatus of Aspect 24, wherein the power control procedure is for uplink communication or sidelink communication.

Aspect 26: The apparatus according to any of Aspects 15-25, wherein to determine the transmit power, the one or more processors are collectively configured to execute the executable instructions to cause the apparatus to select the transmit power as a smallest value among a transmit power limit and a computed transmit power based at least in part on a pathloss between the apparatus and a receiving entity.

Aspect 27: The apparatus of Aspect 26, wherein to determine the transmit power, the one or more processors are collectively configured to execute the executable instructions to cause the apparatus to determine the computed transmit power further based at least in part on an estimated received power at the receiving entity, a subcarrier spacing numerology associated with the signal, a bandwidth associated with the signal, and the pathloss.

Aspect 28: The apparatus according to any of Aspects 15-27, wherein to determine the transmit power, the one or more processors are collectively configured to execute the executable instructions to cause the apparatus to determine the transmit power based on a pathloss between the apparatus and a receiving entity.

Aspect 29: An apparatus, comprising: at least one memory comprising executable instructions; and one or more processors coupled to the at least one memory and collectively configured to execute the executable instructions and cause the apparatus to perform a method in accordance with any of Aspects 1-14.

Aspect 30: An apparatus, comprising means for performing a method in accordance with any of Aspects 1-14.

Aspect 31: A non-transitory computer-readable medium comprising computer-executable instructions that, when executed by one or more processors of a processing system, cause the processing system to perform a method in accordance with any of Aspects 1-14.

Aspect 32: A computer program product embodied on a computer-readable storage medium comprising code for performing a method in accordance with any of Aspects 1-14.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), non-terrestrial networks (NTNs), radio frequency identification (RFID) systems, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development. A NTN is a wireless communication system that generally operates above the Earth's surface, involving satellites at low Earth orbit (LEO), medium Earth orbit (MEO), and geostationary orbit (GEO), high-altitude platforms (HAPS), and drones. RFID systems may implement a communication technology such as RFID, which relies on electromagnetic fields to transmit data between a reader (or scanner) and a tag (or label). RFID tags can generally be categorized into three types: active, semi-passive, and passive.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (CMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (random access memory), flash memory, ROM (read-only memory), PROM (programmable read-only memory), EPROM (erasable programmable read-only memory), EEPROM (electrically erasable programmable read-only memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:

determining a transmit power associated with a transmission occasion;

determining an energy usage associated with the transmission occasion based on the transmit power;

determining a cumulative energy usage for a time window or a time interval associated with a radio frequency (RF) exposure limit based on the energy usage associated with the transmission occasion;

determining whether the cumulative energy usage satisfies an energy budget associated with the time window or the time interval; and transmitting a signal in the transmission occasion at the transmit power responsive to determining that the cumulative energy usage satisfies the energy budget.

2. The method of claim 1, wherein determining the cumulative energy usage comprises determining a sum of the energy usage associated with the transmission occasion and past energy usage within the time window or the time interval.

3. The method of claim 2, further comprising refraining from transmitting in the time window or the time interval if the cumulative energy usage is greater than or equal to the energy budget.

4. The method of claim 1, further comprising:

setting the cumulative energy usage to a value when a timer associated with the time window or the time interval expires; and restarting the timer in response to the timer expiring.

5. The method of claim 4, wherein the value is equal to zero.

6. The method of claim 1, wherein transmitting the signal comprises transmitting the signal in the transmission occasion at the transmit power via a channel if the cumulative energy usage satisfies the energy budget, wherein the energy budget is associated with the channel.

7. The method of claim 6, wherein the channel includes a random access channel, a physical uplink control channel, a physical uplink shared channel, or any combination thereof.

8. The method of claim 6, further comprising:

determining, for each of a plurality of channels, a channel-specific energy budget, wherein the energy budget includes at least one of the channel-specific energy budgets and wherein determining the transmit power comprises determining the transmit power for at least one of the channels associated with the energy budget.

9. The method of claim 8, wherein determining the channel-specific energy budget comprises allocating a portion of a cumulative energy budget as the respective channel-specific energy budget for each of the channels.

10. The method of claim 1, wherein determining the transmit power comprises determining the transmit power based on a power control procedure.

11. The method of claim 10, wherein the power control procedure is for uplink communication or sidelink communication.

12. The method of claim 1, wherein determining the transmit power comprises selecting the transmit power as a smallest value among a transmit power limit and a computed transmit power based at least in part on a pathloss between the wireless device and a receiving entity.

13. The method of claim 12, wherein determining the transmit power comprises determining the computed transmit power further based at least in part on an estimated received power at the receiving entity, a subcarrier spacing numerology associated with the signal, a bandwidth associated with the signal, and the pathloss.

14. The method of claim 1, wherein determining the transmit power comprises determining the transmit power based on a pathloss between the wireless device and a receiving entity.

15. An apparatus for wireless communication, comprising:

one or more memories collectively storing executable instructions; and one or more processors coupled to the one or more memories, the one or more processors being collectively configured to execute the executable instructions to cause the apparatus to:

determine a transmit power associated with a transmission occasion, determine an energy usage associated with the transmission occasion based on the transmit power, determine a cumulative energy usage for a time window or a time interval associated with a radio frequency (RF) exposure limit based on the energy usage associated with the transmission occasion, determine whether the cumulative energy usage satisfies an energy budget associated with the time window or the time interval; and transmit a signal in the transmission occasion at the transmit power responsive to a determination that the cumulative energy usage satisfies the energy budget.

16. The apparatus of claim 15, wherein to determine the cumulative energy usage, the one or more processors are collectively configured to execute the executable instructions to cause the apparatus to determine a sum of the energy usage associated with the transmission occasion and past energy usage within the time window or the time interval.

17. The apparatus of claim 16, wherein the one or more processors are further collectively configured to execute the executable instructions to cause the apparatus to refrain from transmitting in the time window or the time interval if the cumulative energy usage is greater than or equal to the energy budget.

18. The apparatus of claim 15, wherein the one or more processors are further collectively configured to execute the executable instructions to cause the apparatus to:

set the cumulative energy usage to a value when a timer associated with the time window expires or the time interval; and restart the timer in response to the timer expiring.

19. The apparatus of claim 18, wherein the value is equal to zero.

20. The apparatus of claim 15, wherein to transmit the signal, the one or more processors are collectively configured to execute the executable instructions to cause the apparatus to transmit the signal in the transmission occasion at the transmit power via a channel if the cumulative energy usage satisfies the energy budget, and wherein the energy budget is associated with the channel.

21. The apparatus of claim 20, wherein the channel includes a random access channel, a physical uplink control channel, a physical uplink shared channel, or any combination thereof.

22. The apparatus of claim 20, wherein the one or more processors are further collectively configured to execute the executable instructions to cause the apparatus to:

determine, for each of a plurality of channels, a channel-specific energy budget, wherein the energy budget includes at least one of the channel-specific energy budgets, and determine the transmit power for at least one of the channels associated with the energy budget.

23. The apparatus of claim 22, wherein to determine the channel-specific energy budget, the one or more processors are collectively configured to execute the executable instructions to cause the apparatus to allocate a portion of a cumulative energy budget as the respective channel-specific energy budget for each of the channels.

24. The apparatus of claim 15, wherein to determine the transmit power, the one or more processors are collectively configured to execute the executable instructions to cause the apparatus to determine the transmit power based on a power control procedure.

25. The apparatus of claim 24, wherein the power control procedure is for uplink communication or sidelink communication.

26. The apparatus of claim 15, wherein to determine the transmit power, the one or more processors are collectively configured to execute the executable instructions to cause the apparatus to select the transmit power as a smallest value among a transmit power limit and a computed transmit power based at least in part on a pathloss between the apparatus and a receiving entity.

27. The apparatus of claim 26, wherein to determine the transmit power, the one or more processors are collectively configured to execute the executable instructions to cause the apparatus to determine the computed transmit power further based at least in part on an estimated received power at the receiving entity, a subcarrier spacing numerology associated with the signal, a bandwidth associated with the signal, and the pathloss.

28. The apparatus of claim 15, wherein to determine the transmit power, the one or more processors are collectively configured to execute the executable instructions to cause the apparatus to determine the transmit power based on a pathloss between the apparatus and a receiving entity.

29. An apparatus for wireless communication, comprising:

means for determining a transmit power associated with a transmission occasion;

means for determining an energy usage associated with the transmission occasion based on the transmit power;

means for determining a cumulative energy usage for a time window or a time interval associated with a radio frequency (RF) exposure limit based on the energy usage associated with the transmission occasion;

means for determining whether the cumulative energy usage satisfies an energy budget associated with the time window or the time interval; and means for transmitting a signal in the transmission occasion at the transmit power responsive to determining that the cumulative energy usage satisfies the energy budget.

30. A non-transitory computer-readable medium comprising instructions stored thereon, which when executed by an apparatus, cause the apparatus to perform an operation comprising:

determining a transmit power associated with a transmission occasion;

determining an energy usage associated with the transmission occasion based on the transmit power;

determining a cumulative energy usage for a time window or a time interval associated with a radio frequency (RF) exposure limit based on the energy usage associated with the transmission occasion;

determining whether the cumulative energy usage satisfies an energy budget associated with the time window or the time interval; and transmitting a signal in the transmission occasion at the transmit power responsive to determining that the cumulative energy usage satisfies the energy budget.

* * * * *